(12) United States Patent
Prior

(10) Patent No.: US 12,509,166 B2
(45) Date of Patent: Dec. 30, 2025

(54) PIVOTABLE CARRIER ASSEMBLY

(71) Applicant: Ford Global Technologies, LLC, Dearborn, MI (US)

(72) Inventor: Joseph Prior, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 18/338,494

(22) Filed: Jun. 21, 2023

(65) Prior Publication Data
US 2024/0425122 A1 Dec. 26, 2024

(51) Int. Cl.
*B62D 43/02* (2006.01)

(52) U.S. Cl.
CPC .................... *B62D 43/02* (2013.01)

(58) Field of Classification Search
CPC ............ B60R 9/06; B60R 9/065; B62D 43/02
See application file for complete search history.

(56) References Cited

U.S. PATENT DOCUMENTS

| | | | |
|---|---|---|---|
| 2,643,041 A | 6/1953 | Lundgren | |
| 2,823,070 A | 2/1958 | Walker | |
| 3,362,597 A | 1/1968 | Beach, Jr. | |
| 4,485,945 A | 12/1984 | Ankeny | |
| 4,869,409 A | 9/1989 | Wright | |
| 5,020,707 A | 6/1991 | Nozel et al. | |
| 5,186,371 A * | 2/1993 | Jozefczak | B62D 43/002 414/463 |
| 5,333,766 A * | 8/1994 | Fisher | B62D 43/02 224/42.28 |
| 5,538,168 A * | 7/1996 | Burger | B62D 43/02 224/42.28 |
| 6,189,748 B1 * | 2/2001 | Hutter | B62D 43/002 224/42.28 |
| 7,631,791 B1 * | 12/2009 | Allen | B60R 9/10 224/531 |
| 10,479,284 B1 * | 11/2019 | Salyer | B60R 9/06 |
| 10,661,845 B2 * | 5/2020 | Wymore | B62D 43/002 |
| 2004/0050886 A1 | 3/2004 | Slovick | |
| 2004/0222261 A1 * | 11/2004 | Wilson | B62D 43/002 224/42.21 |
| 2005/0199671 A1 | 9/2005 | Riley | |
| 2005/0274760 A1 | 12/2005 | Buckner et al. | |
| 2020/0148289 A1 | 5/2020 | Evans | |

FOREIGN PATENT DOCUMENTS

CN 201494522 U 6/2010

* cited by examiner

*Primary Examiner* — Scott T Mcnurlen
(74) *Attorney, Agent, or Firm* — Vichit Chea; Carlson, Gaskey & Olds, P.C.

(57) ABSTRACT

A device may include a carrier assembly connected to a vehicle and having a first arm configured to connect to a first location on the vehicle and a second arm configured to connect to a second location on the vehicle, the second location spaced outboard of the first location, the carrier assembly configured to pivot between a stowed position and an accessing position.

15 Claims, 4 Drawing Sheets

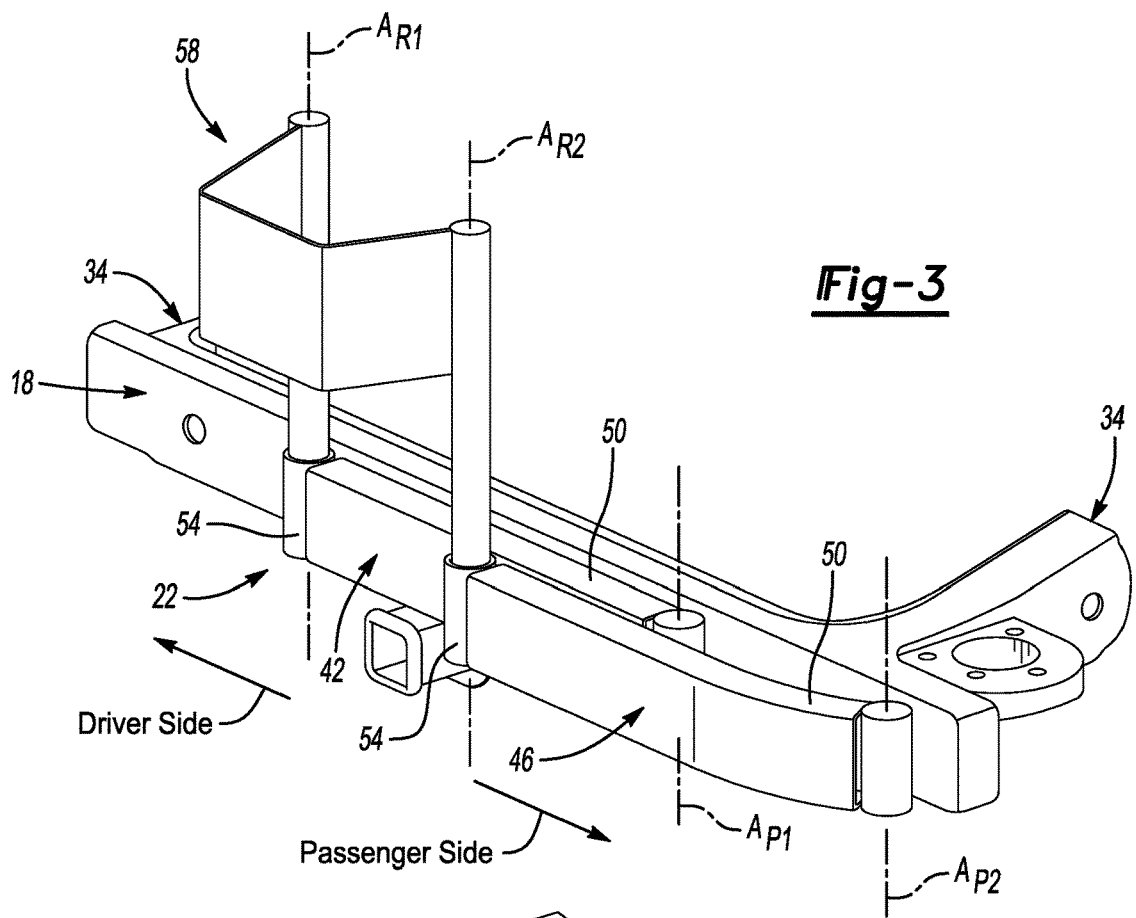
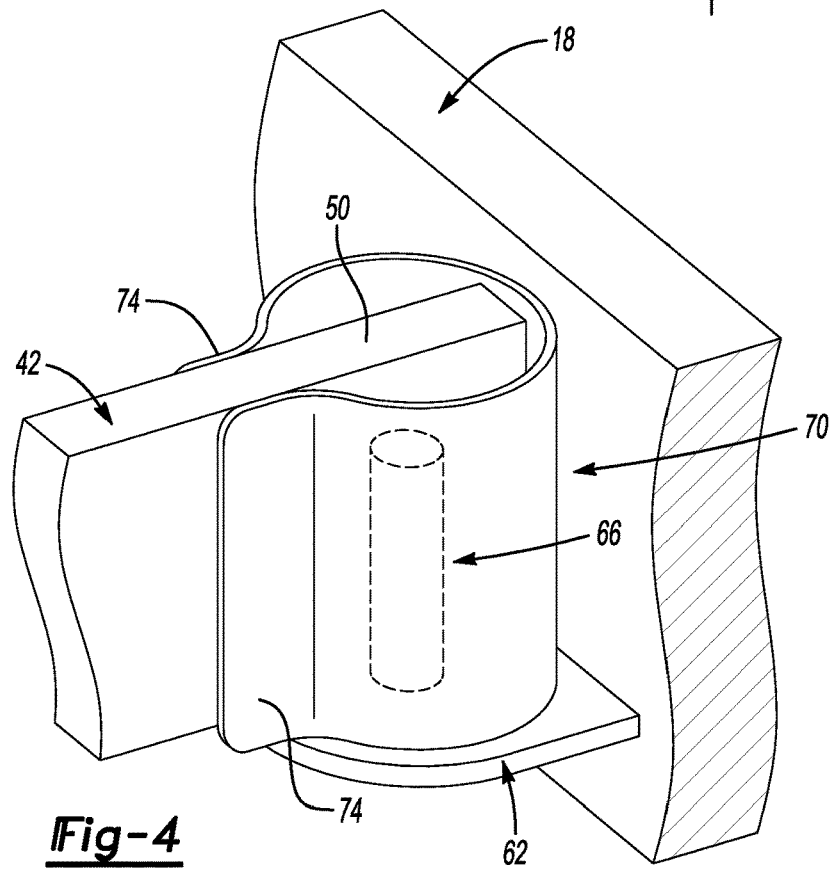

PIVOTABLE CARRIER ASSEMBLY

TECHNICAL FIELD

This disclosure relates generally to carrier assemblies for vehicles and, more particularly, to carrier assemblies that pivot.

BACKGROUND

A carrier assembly can be mounted to a vehicle. The carrier assembly can be used to secure cargo like spare tires, bikes, kayaks, skis, etc. to the vehicle. Some carrier assemblies can be repositioned so that the carrier assembly does not interfere with opening and closing a closure module of the vehicle, such as a tailgate or a door of the vehicle.

SUMMARY

In some aspects, the techniques described herein relate to a vehicle assembly, including: a carrier assembly connected to a vehicle and having a first arm configured to connect to a first location on the vehicle and a second arm configured to connect to a second location on the vehicle, the second location spaced outboard of the first location, the carrier assembly configured to pivot between a stowed position and an accessing position.

In some aspects, the techniques described herein relate to a vehicle assembly, wherein each of the first arm and the second arm extend between an engagement end that is pivotably connected to the vehicle to permit the carrier assembly to pivot between the stowed position and the accessing position, and a support end that is pivotably connected to a support assembly.

In some aspects, the techniques described herein relate to a vehicle assembly, wherein the support assembly includes a pair of support bars extending vertically upwards from the support end.

In some aspects, the techniques described herein relate to a vehicle assembly, further including a bracket member spanning between the support bars, the bracket member configured to support a spare tire.

In some aspects, the techniques described herein relate to a vehicle assembly, wherein the bracket member includes a first section connected to one of the support bars, a second section connected to a different one of support bars, and a third section connecting the first section and the second section, and wherein the first section and the second section extend from the third section at oblique angles.

In some aspects, the techniques described herein relate to a vehicle assembly, wherein the first section has a first length and the second section has a second length, and the second length is less than the first length.

In some aspects, the techniques described herein relate to a vehicle assembly, wherein when the carrier assembly is in the stowed position, the third section is aligned with a rear bumper of the vehicle, and wherein when the carrier assembly is in the accessing position, the third section is pivoted relative to the rear bumper.

In some aspects, the techniques described herein relate to a vehicle assembly, wherein when the carrier assembly is in the stowed position, the first arm abuts a rear bumper of the vehicle and at least a portion of the second arm abuts the first arm to provide a barrier to a tailgate of the vehicle, and wherein when the carrier assembly is in the accessing position, the first arm and the second arm are spaced from the rear bumper to permit the tailgate to move between a closed position and an open position.

In some aspects, the techniques described herein relate to a vehicle assembly, wherein the second arm includes a first section and a second section, and the second section is curved relative to the first section.

In some aspects, the techniques described herein relate to a vehicle assembly, wherein when the carrier assembly is in the stowed position, the first arm abuts the vehicle, at least a portion of the first section abuts the first arm, and an apex of the second section extends outward away from the vehicle, and wherein when the carrier assembly is in the accessing position, at least a portion of the first arm abuts the second arm and at least a portion of the second section abuts the vehicle.

In some aspects, the techniques described herein relate to a vehicle assembly, including: a side rail of a vehicle, the side rail extending along a side rail axis; a rear bumper of the vehicle, the rear bumper extending longitudinally along a cross-member axis that is transverse to the side rail axis, the rear bumper extending from an end portion of the side rail; and a carrier assembly connected to the rear bumper and having a first arm configured to connect to a first location inboard of the side rail and a second arm configured to connect to a second location outboard of the side rail, the carrier assembly configured to pivot between a stowed position and an accessing position.

In some aspects, the techniques described herein relate to a vehicle assembly, wherein each of the first arm and the second arm extend between an engagement end that is pivotably connected to the rear bumper to permit the carrier assembly to pivot between the stowed position and the accessing position, and a support end that is pivotably connected to a support assembly.

In some aspects, the techniques described herein relate to a vehicle assembly, wherein the support assembly includes a pair of support bars extending vertically upwards from the support end.

In some aspects, the techniques described herein relate to a vehicle assembly, further including a bracket member spanning between the support bars, the bracket member configured to support a spare tire.

In some aspects, the techniques described herein relate to a vehicle assembly, wherein the bracket member includes a first section connected to one of the support bars, a second section connected to a different one of support bars, and a third section connecting the first section and the second section, and wherein the first section and the second section extend from the third section at oblique angles.

In some aspects, the techniques described herein relate to a vehicle assembly, wherein when the carrier assembly is in the stowed position, the third section is aligned with a rear bumper, and wherein when the carrier assembly is in the accessing position, the third section is pivoted relative to the rear bumper.

In some aspects, the techniques described herein relate to a vehicle assembly, wherein when the carrier assembly is in the stowed position, the support assembly is inboard of the side rail, and wherein when the carrier assembly is in the accessing position, the support assembly in outboard of the side rail and an end of the rear bumper.

In some aspects, the techniques described herein relate to a vehicle assembly, wherein when the carrier assembly is in the stowed position, the first arm abuts the rear bumper and at least a portion of the second arm abuts the first arm to provide a barrier to a tailgate of the vehicle, and wherein when the carrier assembly is in the accessing position, the first arm and the second arm are spaced from the rear bumper to permit the tailgate to move between a closed position and an open position.

In some aspects, the techniques described herein relate to a vehicle assembly, wherein the second arm includes a first section and a second section, and the second section is curved relative to the first section.

In some aspects, the techniques described herein relate to a vehicle assembly, wherein when the carrier assembly is in the stowed position, the first arm abuts the rear bumper, at least a portion of the first section abuts the first arm, and an apex of the second section extends outward away from the rear bumper, and wherein when the carrier assembly is in the accessing position, at least a portion of the first arm abuts the second arm and at least a portion of the second section abuts the rear bumper.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates a perspective view of the carrier assembly of FIGS. 1 and 2 secured to a rear bumper of the vehicle.

FIG. 4 illustrates a close up view of a portion of the carrier assembly of FIG. 3.

DETAILED DESCRIPTION

This disclosure relates generally to a carrier assembly that can pivot relative to a vehicle between a stowed position and an accessing position. Positioning the carrier assembly in the accessing position can permit opening a tailgate of the vehicle. These and other features are discussed in greater detail in the following paragraphs of this detailed description.

Figure 1:
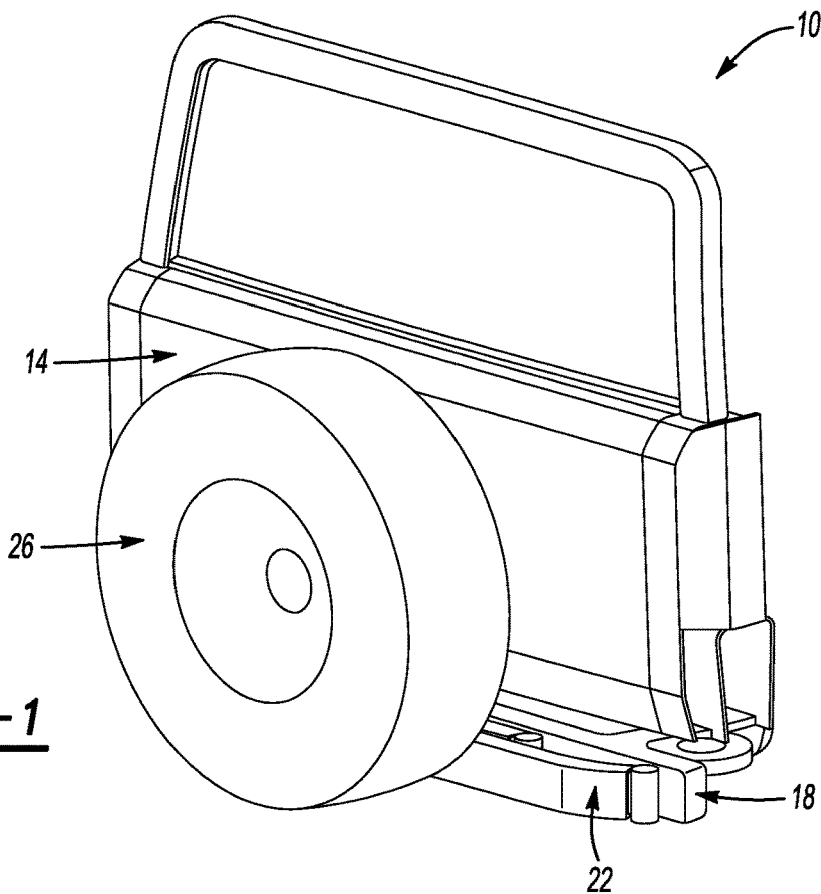
FIG. 1 illustrates a selected portion of a vehicle showing a carrier assembly in a stowed position according to an exemplary embodiment of the present disclosure.
Figure 2:
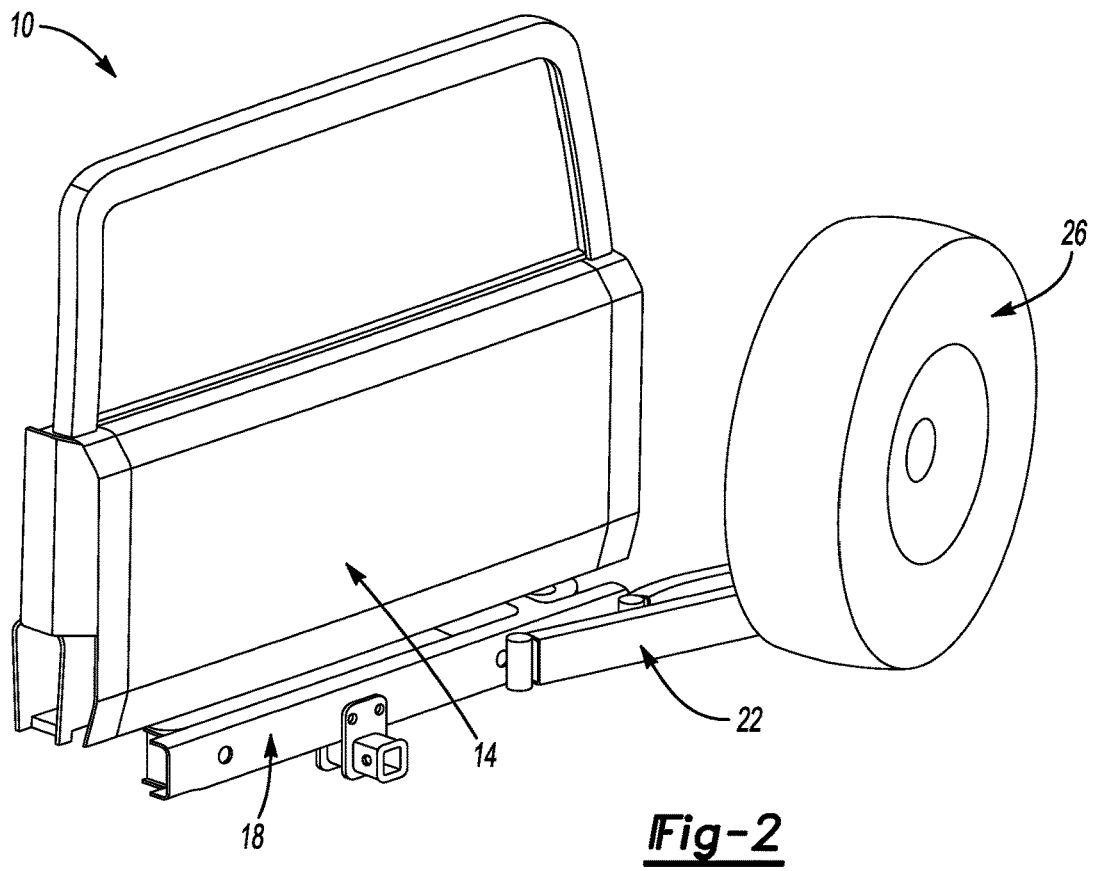
FIG. 2 illustrates selected portions of the vehicle of FIG. 1 showing the carrier assembly in an accessing position.

With reference to FIGS. 1 and 2, a vehicle 10 includes a closure module, here a tailgate 14, a rear bumper 18, a carrier assembly 22, and a spare tire 26. Together, the closure module 14, the rear bumper 18, the carrier assembly 22, and the spare tire 26 establish a vehicle assembly of the vehicle 10.

In the exemplary embodiment, the vehicle 10 is a sport utility vehicle (SUV). However, the vehicle 10 could alternatively be a car, a van, a pickup truck, or any other vehicle configuration.

The tailgate 14 can move between a closed position as shown and an open position. When in the closed position, the tailgate 14 provides a barrier between the interior and exterior of the vehicle 10. When in the open position, the tailgate 14 permits users to access a cargo area of the vehicle 10.

The tailgate 14 is a type of closure module. In another example, the closure module could be a door, trunk lid, hood or any other type of closure module configuration.

The rear bumper 18 is vertically beneath the tailgate 14. The rear bumper 18 in this example supports the carrier assembly 22, which can then support the spare tire 26.

The carrier assembly 22 is pivotably connected to the rear bumper 18. The carrier assembly 22 can move between a stowed position shown in FIG. 1 and an accessing position shown in FIG. 2 relative to the rear bumper 18. In the illustrated example, when in the stowed position, the carrier assembly 22 blocks a user from accessing the tailgate 14. When in the accessing position, the carrier assembly 22 is rotated such that the tailgate 14 can be accessed by a user and moved between the closed position and the open position.

Although a specific component relationship is illustrated in the figures of this disclosure, the illustrations are not intended to limit this disclosure. The placement and orientation of the various components of the vehicle 10 are shown schematically and could vary within the scope of this disclosure.

Figure 6A:
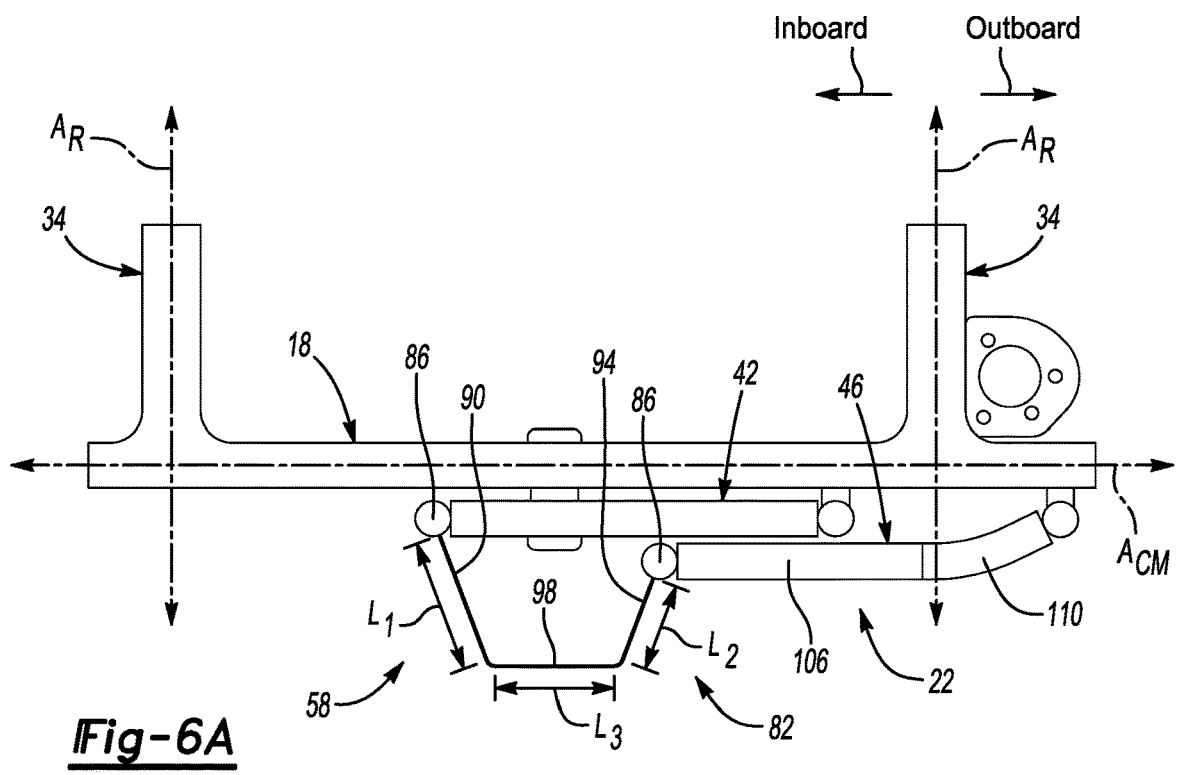
FIG. 6A is a top view of the carrier assembly of FIG. 4 in a stowed position.

With reference to FIGS. 3 and 6A, the rear bumper 18 is supported on a pair of side rails 34. One of the side rails 34 is on a driver side. The other of the side rails 34 is on a passenger side. The side rails 34 extend longitudinally along a length of the vehicle 10. The side rails 34 each extend longitudinally along a respective rail axis $A_R$. The rear bumper 18 extends longitudinally along a cross-member axis $A_{CM}$ between the side rails 34 in a cross-vehicle direction. The cross-member axis $A_{CM}$ is transverse to the rail axes $A_R$ in this example.

The carrier assembly 22 connects directly to the rear bumper 18 in this example. In particular, the carrier assembly 22 includes a first arm 42 and a second arm 46 that are each pivotably connected to the rear bumper 18. The first arm 42 is connected to a first location on the rear bumper 18 and the second arm 46 is connected to a second location on the rear bumper 18. In the illustrated example, the second location is spaced outboard of the first location.

The first arm 42 and the second arm 46 each extend between an engagement end 50 that connects to the rear bumper 18 and a support end 54 that connects to a load-bearing component, here a support assembly 58. In this example, the engagement end 50 of the first arm 42 is inboard of the side rail 34 and the engagement end 50 of the second arm 46 is outboard of the side rail 34.

As shown in FIG. 4, the rear bumper 18 includes a base member 62 that projects outward from a side of the rear bumper 18 and a post member 66 that extends vertically upward from the base member 62. The post member 66 provides a pivot point for the first arm 42 and the second arm 46 to pivot relative to the rear bumper 18.

In this example, the engagement end 50 of the first arm 42 includes an opening for receiving the post 66. The engagement end 50 also includes a latch member 70 for supporting each of the first and second arms 42. The latch member 70 includes a pair of flanges 74 that extend outward. The engagement end 50 and the flanges 74 can be secured (e.g., bolted, welded, adhered, etc.) together. With the engagement end 50 mounted on the post member 66, the first arm 42 can pivot about a first pivot axis $A_{P1}$ relative to the rear bumper 18, as shown in FIG. 3. The second arm 46 is pivotably coupled to the rear bumper 18 similarly to the first arm 42 so that the second arm 46 can pivot about a second pivot axis $A_{P2}$ relative to the bumper 18.

Figure 5:
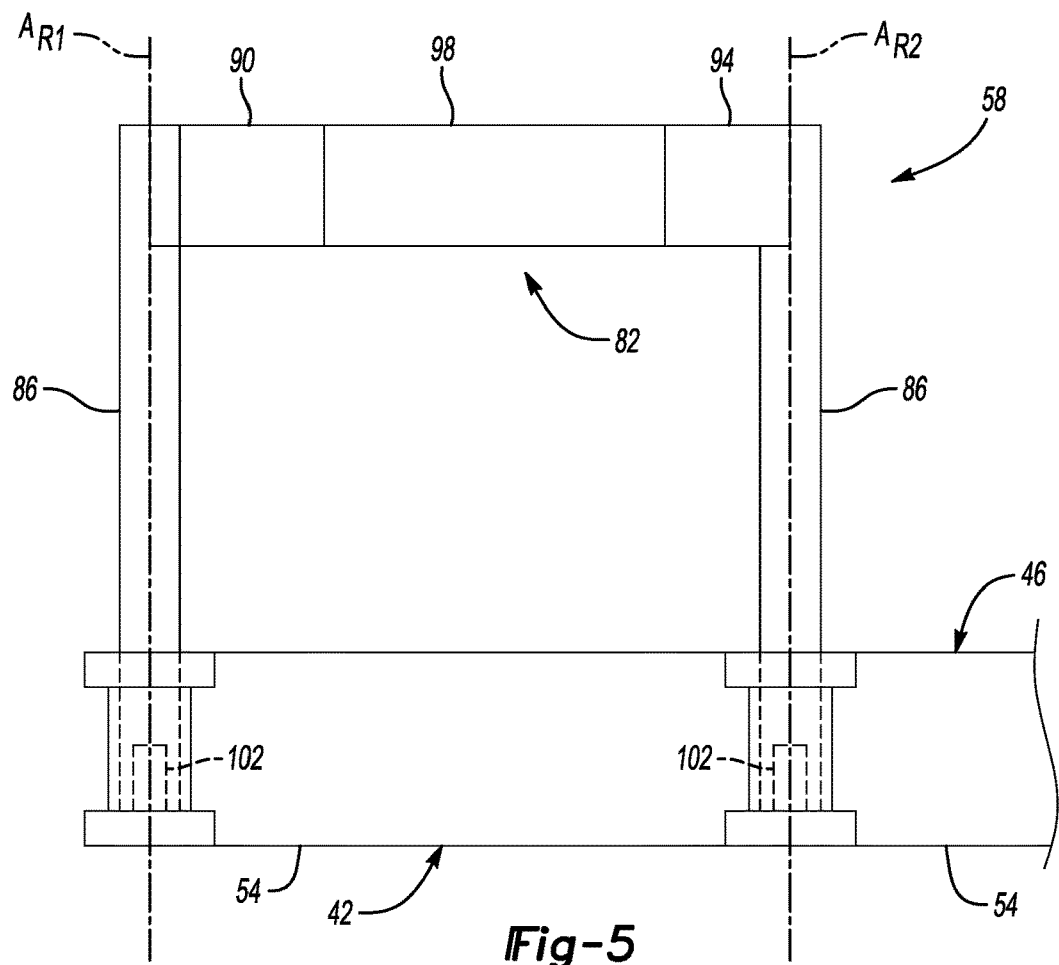
FIG. 5 illustrates a close up view of another portion of the carrier assembly of FIG. 3.

The first arm 42 and the second arm 46 are pivotably connected to the support assembly 58. As shown in FIG. 5, the support assembly 58 includes a bracket member 82 and a pair of support bars 86. The bracket member 82 is configured to directly support cargo, such as the spare tire 26 shown in FIGS. 1 and 2. The bracket member 82 spans between the support bars 86.

In this example, the bracket member 82 includes a first section 90, a second section 94, and a third section 98. The first section 90 extends from the third section 98 at an oblique angle and connects to one of the support bars 86, and the second section 94 extends from the third section 98 at an oblique angle and connects to a different one of the support bars 86, such that the bracket member 82 provides a projection extending outward away from the rear bumper 18. As discussed further below, the bracket member 82 can pivot with the first arm 42 and the second arm 46 as the carrier assembly 22 is moved between the stowed position and the accessing position.

In one example, the spare tire 26 is supported on the bracket member 82 via weld studs that are disposed on the third section 98 of the bracket member 82.

In this example, the first section 90 has a first length $L_1$, the second section 94 has a second length $L_2$, and the second length $L_2$ is less than the first length $L_1$. In another example, the third section 98 has a third length $L_3$ that is less than the first length $L_1$ and substantially equal to the second length $L_2$.

The support bars 86 extend vertically downward from the bracket member 82 and into contact with a respective one of the first arm 42 and the second arm 46. The support end 54 on the first arm 42 and the second arm 46 each include a bore configured to receive the respective support bars 82 in this example. A post member 102 extends vertically upwards from a lower wall of the first arm 42 and the second arm 46. The post member 102 is received within an opening provided on an end of the support bars 86. With the support bars 86 connected to the first arm 42 and the second arm 46, the post member 102 can rotate about a first rotational axis $A_{R1}$ relative to one of the support bars 82 and a second rotational axis $A_{R2}$ relative to a different one of the support bars 82.

Figure 6B:
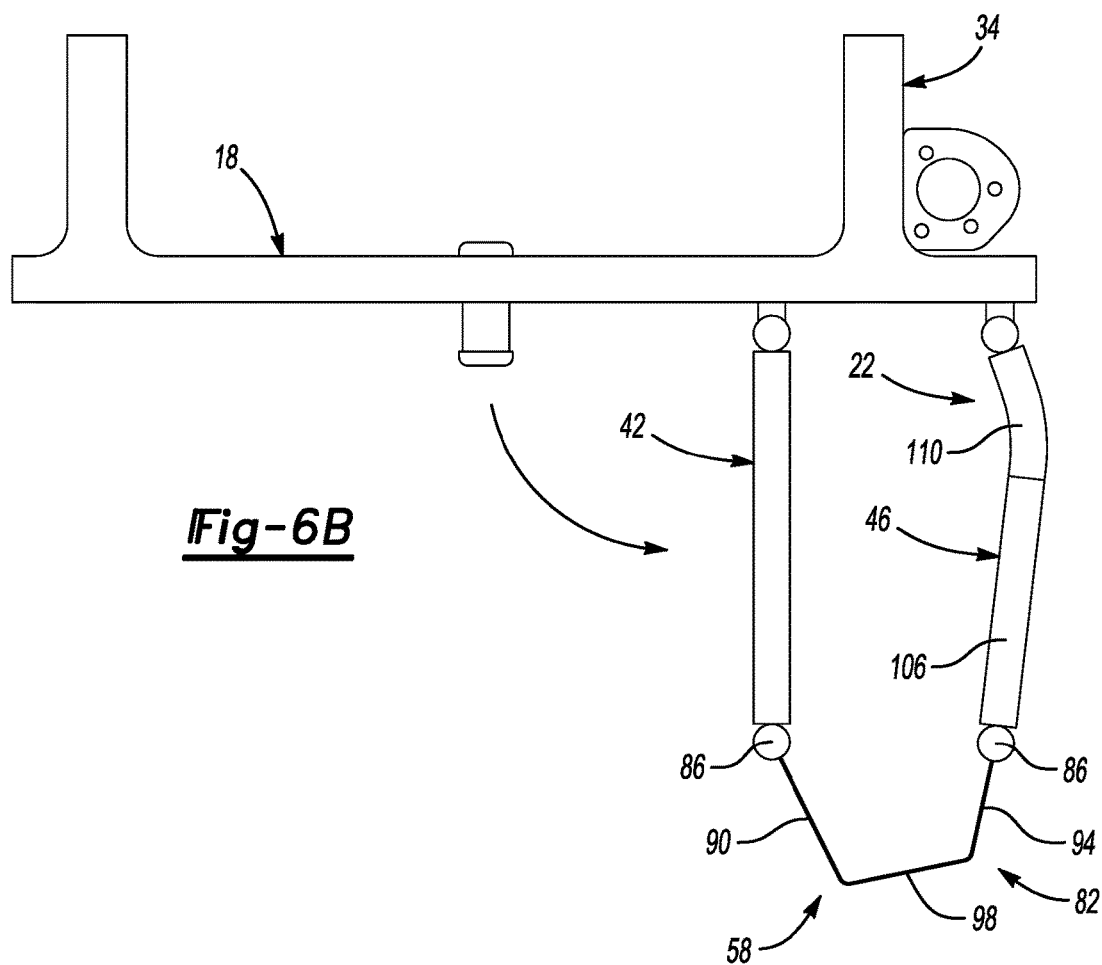
FIG. 6B is top view of the carrier assembly of FIG. 4 moved from the stowed position of FIG. 6A toward an accessing position.
Figure 6C:
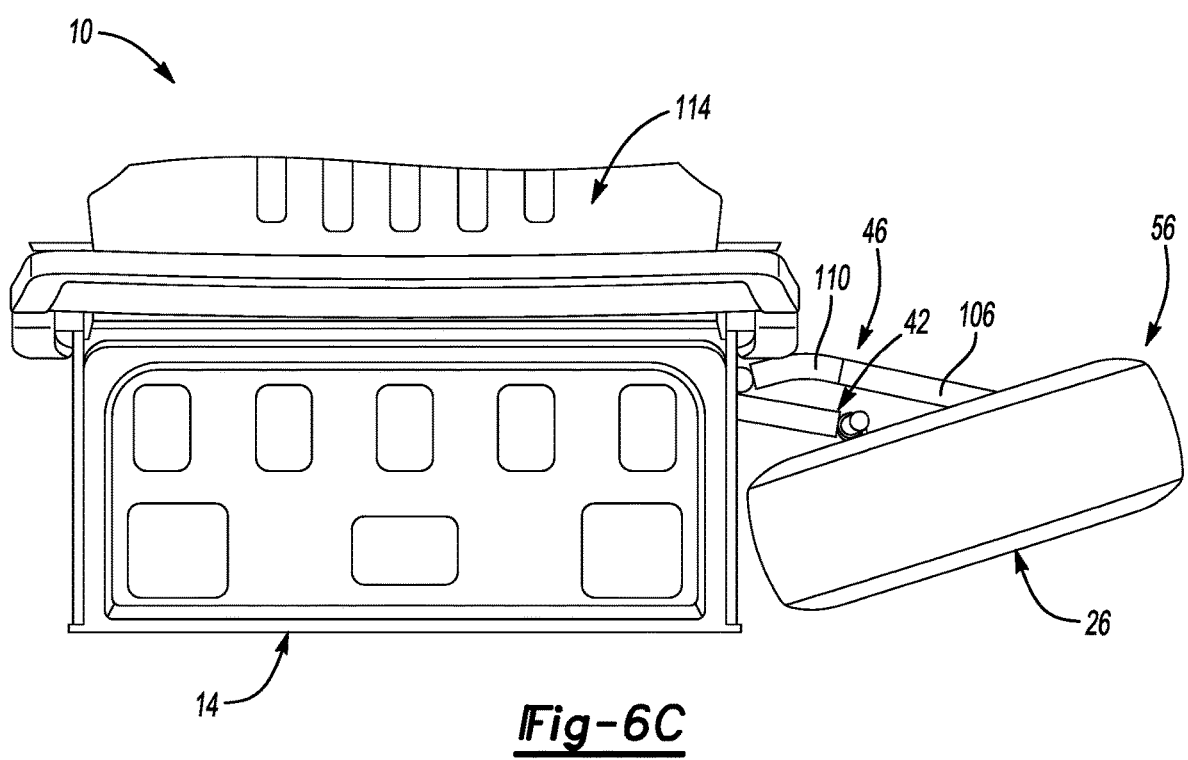
FIG. 6C is a top view of the carrier assembly of FIG. 4 in the accessing position with a tailgate of the vehicle pivoted to an open position.

FIGS. 6A-6C illustrate the carrier assembly 22 moving between a stowed position (FIG. 6A) and an accessing position (FIG. 6C). Referring to FIG. 6A, when the carrier assembly 22 in the stowed position, the support assembly 58 is inboard of the side rail 34, the first arm 42 abuts the rear bumper 18, and the second arm 46 abuts the first arm 42.

The second arm 46 includes a first section 106 and a second section 110 that is curved relative to the first section 106 so that, while in the stowed position, the first section 106 is aligned with the first arm 42, the rear bumper 18, and at least a portion of the first section 106 abuts the first arm 42. In the illustrated example, the second section 110 is angled and an apex of the second section 110 extends outward away from the rear bumper 18. Referring to the bracket member 82, the first length $L_1$ of the first section 90 is larger than the second length $L_2$ of the second section 94. In combination, this configuration can help to maintain alignment of the third section 98 of the bracket member 62 relative to the rear bumper 18, the first arm 42, and the first section 106 of the first arm 42.

Referring to FIG. 6B, as the carrier assembly 22 is moved from the stowed position, the first arm 42 pivots about the first pivot axis $A_{P1}$ relative to the rear bumper 18 and the second arm 46 pivots about the second pivot axis $A_{P2}$ relative to the rear bumper 18 (see FIG. 3). The bracket member 82 of the support assembly 58 can pivot with the first arm 42 and the second arm 46 as the carrier assembly 22 is moved between the stowed position and the accessing position. For instance, when the carrier assembly 22 is moved from the stowed position, the post member 102 on the first arm 42 rotates about the first rotational axis $A_{R1}$ relative to one of the support bars 86 and the post member 102 on the second arm 46 rotates about the second rotational axis $A_{R2}$ relative to a different one of the support bars 86 (see FIG. 5).

As the first arm 42 and the second arm 46 are pivoted outward away from the rear bumper 18, as shown in FIG. 6B, the third section 98 of bracket member 82 pivots inward toward the rear bumper 18.

When the carrier assembly 22 is pivoted to the accessing position, as shown in FIG. 6C, the first arm 42 abuts at least a portion of the second section 110 of the second arm 46 and the second section 110 abuts the rear bumper 18. In the accessing position, the support assembly 56 is outboard of the side rail 34 and an end of the rear bumper 18.

In one example, the first arm 42 is pivoted about 170 degrees when the carrier assembly 22 is pivoted from the stowed position to the accessing position. The support member 58 is pivoted up to about 17 degrees when the carrier assembly 22 is pivoted from the stowed position to the accessing position.

While in the stowed position, the first arm 42 abuts the rear bumper 18 and a least a portion of the second arm 46 abuts the first arm 42 to provide a barrier to the tailgate 14 (FIG. 1). When the carrier assembly 22 is pivoted to the accessing position, the first arm 42 and the second arm 46 are pivoted outward away from the rear bumper 18 to provide clearance therebetween so that a user can access the tailgate 14 (FIG. 2). While in the accessing position, the tailgate 14 can pivot between the closed position and the open position to provide more access to a cargo area 114 of the vehicle 10 (FIG. 6C). As shown, the bracket assembly 82 and thus the spare tire 26 pivot with the first arm 42 and the second arm 46.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly, comprising:
a carrier assembly connected to a vehicle and having a first arm configured to connect to a first location on the vehicle and a second arm configured to connect to a second location on the vehicle, the second location spaced outboard of the first location, the carrier assembly configured to pivot between a stowed position and an accessing position, wherein each of the first arm and the second arm extend between an engagement end that is pivotably connected to the vehicle to permit the carrier assembly to pivot between the stowed position and the accessing position, and a support end that is pivotably connected to a support assembly,
wherein the support assembly includes a pair of support bars extending vertically upwards from the support end,
wherein the support end of the first arm and the second arm includes a bore configured to receive one of the support bars, the support bars each configured to rotate within the bore about a respective rotation axis when the carrier assembly transitions between the stowed position and the accessing position.

2. The vehicle assembly of claim 1, further comprising a bracket member spanning between the support bars, the bracket member configured to support a spare tire.

3. The vehicle assembly of claim 1, further comprising a bracket member spanning between the support bars, wherein the bracket member includes a first section connected to one of the support bars, a second section connected to a different one of support bars, and a third section connecting the first section and the second section, and wherein the first section and the second section extend from the third section at oblique angles.

4. The vehicle assembly of claim 3, wherein the first section has a first length and the second section has a second length, and the second length is less than the first length.

5. The vehicle assembly of claim 3, wherein when the carrier assembly is in the stowed position, the third section is aligned with a rear bumper of the vehicle, and wherein when the carrier assembly is in the accessing position, the third section is pivoted relative to the rear bumper.

6. The vehicle assembly of claim 1, wherein when the carrier assembly is in the stowed position, the first arm abuts a rear bumper of the vehicle and at least a portion of the second arm abuts the first arm to provide a barrier to a tailgate of the vehicle, and wherein when the carrier assembly is in the accessing position, the first arm and at least a portion of the second arm are spaced from the rear bumper to permit the tailgate to move between a closed position and an open position.

7. The vehicle assembly of claim 1, wherein the second arm includes a first section and a second section, and the second section is curved relative to the first section.

8. The vehicle assembly of claim 7, wherein when the carrier assembly is in the stowed position, the first arm abuts the vehicle, at least a portion of the first section abuts the first arm, and an apex of the second section extends outward away from the vehicle, and wherein when the carrier assembly is in the accessing position, at least a portion of the first arm abuts the second arm and at least a portion of the second section abuts the vehicle.

9. A vehicle assembly, comprising:
a side rail of a vehicle, the side rail extending along a side rail axis;
a rear bumper of the vehicle, the rear bumper extending longitudinally along a cross-member axis that is transverse to the side rail axis, the rear bumper extending from an end portion of the side rail; and
a carrier assembly connected to the rear bumper and having a first arm configured to connect to a first location inboard of the side rail and a second arm configured to connect to a second location outboard of the side rail, the carrier assembly configured to pivot between a stowed position and an accessing position, wherein each of the first arm and the second arm extend between an engagement end that is pivotably connected to the rear bumper to permit the carrier assembly to pivot between the stowed position and the accessing position, and a support end that is pivotably connected to a support assembly,
wherein the support assembly includes a pair of support bars extending vertically upwards from the support end,
wherein the support end of the first arm and the second arm includes a bore configured to receive one of the support bars, the support bars each configured to rotate within the bore about a respective rotation axis when the carrier assembly transitions between the stowed position and the accessing position.

10. The vehicle assembly of claim 9, further comprising a bracket member spanning between the support bars, the bracket member configured to support a spare tire.

11. The vehicle assembly of claim 9, further comprising a bracket member spanning between the support bars, wherein the bracket member includes a first section connected to one of the support bars, a second section connected to a different one of support bars, and a third section connecting the first section and the second section, and wherein the first section and the second section extend from the third section at oblique angles.

12. The vehicle assembly of claim 11, wherein when the carrier assembly is in the stowed position, the third section is aligned with a rear bumper, and wherein when the carrier assembly is in the accessing position, the third section is pivoted relative to the rear bumper.

13. The vehicle assembly of claim 9, wherein when the carrier assembly is in the stowed position, the support assembly is inboard of the side rail, and wherein when the carrier assembly is in the accessing position, the support assembly is outboard of the side rail and an end of the rear bumper.

14. The vehicle assembly of claim 9, wherein when the carrier assembly is in the stowed position, the first arm abuts the rear bumper and at least a portion of the second arm abuts the first arm to provide a barrier to a tailgate of the vehicle, and wherein when the carrier assembly is in the accessing position, the first arm and at least a portion of the second arm are spaced from the rear bumper to permit the tailgate to move between a closed position and an open position.

15. The vehicle assembly of claim 9, wherein the second arm includes a first section and a second section, and the second section is curved relative to the first section, and when the carrier assembly is in the stowed position, the first arm abuts the rear bumper, at least a portion of the first section abuts the first arm, and an apex of the second section extends outward away from the rear bumper, and wherein when the carrier assembly is in the accessing position, at least a portion of the first arm abuts the second arm and at least a portion of the second section abuts the rear bumper.

* * * * *